United States Patent [19]

Nerlich

[11] 4,116,533

[45] Sep. 26, 1978

[54] STEREOSCOPIC VIEWER

[75] Inventor: Gunter Nerlich, Toronto, Canada

[73] Assignee: Dimensional Products Limited, Canada

[21] Appl. No.: 693,408

[22] Filed: Jun. 7, 1976

[51] Int. Cl.² ............................................. G02B 27/22
[52] U.S. Cl. .................................. 350/135; 350/141; 350/241
[58] Field of Search ............... 350/134, 135, 141, 241; 352/126; 353/7, DIG. 2

[56] References Cited

U.S. PATENT DOCUMENTS

| 2,667,810 | 2/1954 | Jaros | 350/135 |
| 3,384,436 | 5/1968 | Kunnel | 350/134 X |
| 3,473,870 | 10/1969 | Platt | 350/135 X |

FOREIGN PATENT DOCUMENTS 831,217   8/1938   France .................................... 350/135

Primary Examiner—John K. Corbin
Assistant Examiner—Matthew W. Koren

[57] ABSTRACT

A viewer for a stereoscopic filmstrip and a method of manufacturing such a filmstrip are described. In the specific embodiment, the filmstrip is in the form of a continuous loop which is advanced by a lever-operated film transport mechanism.

4 Claims, 15 Drawing Figures

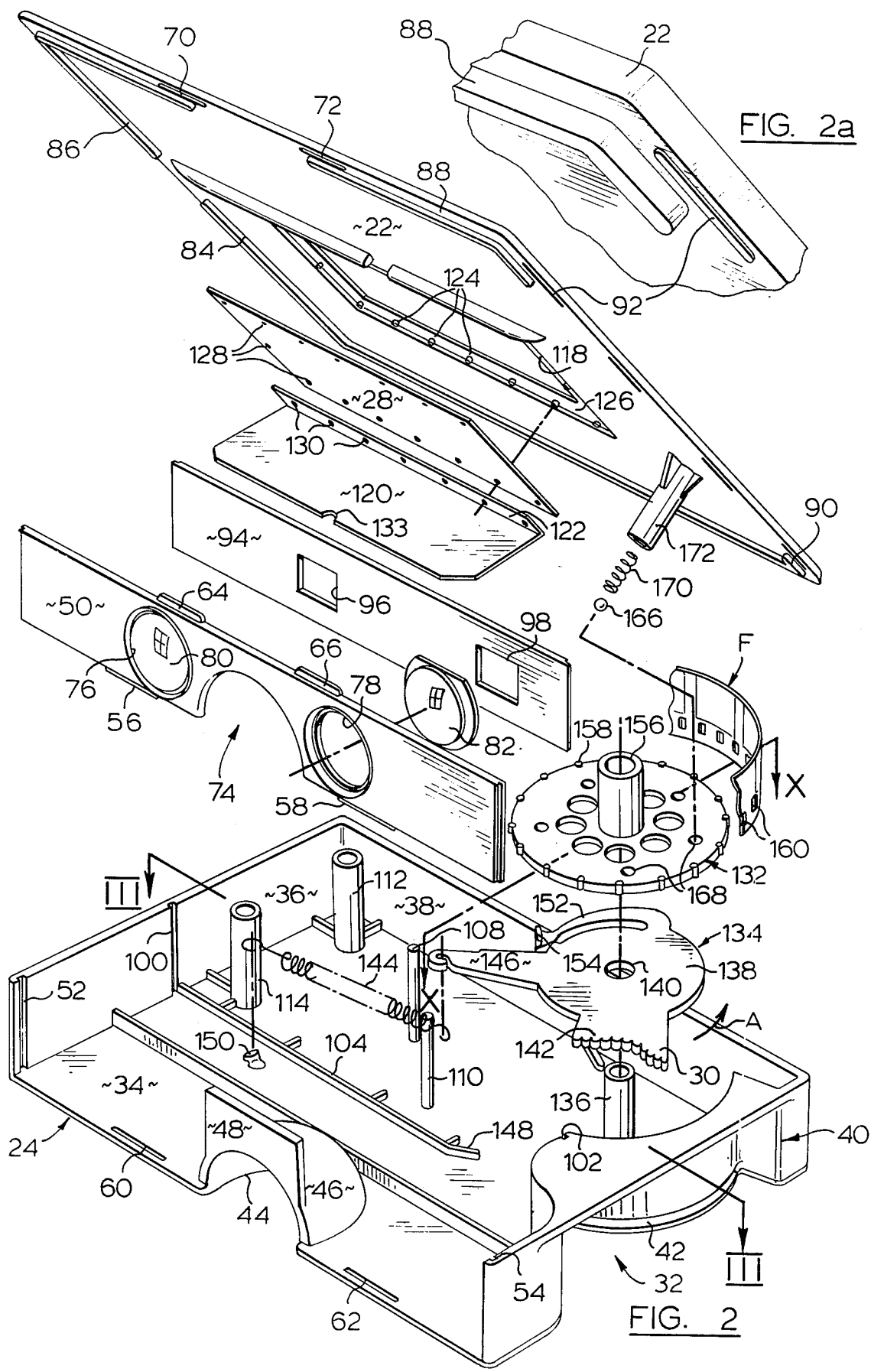

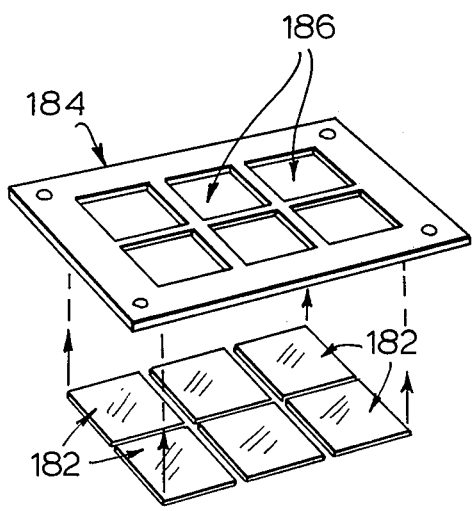
FIG. 12
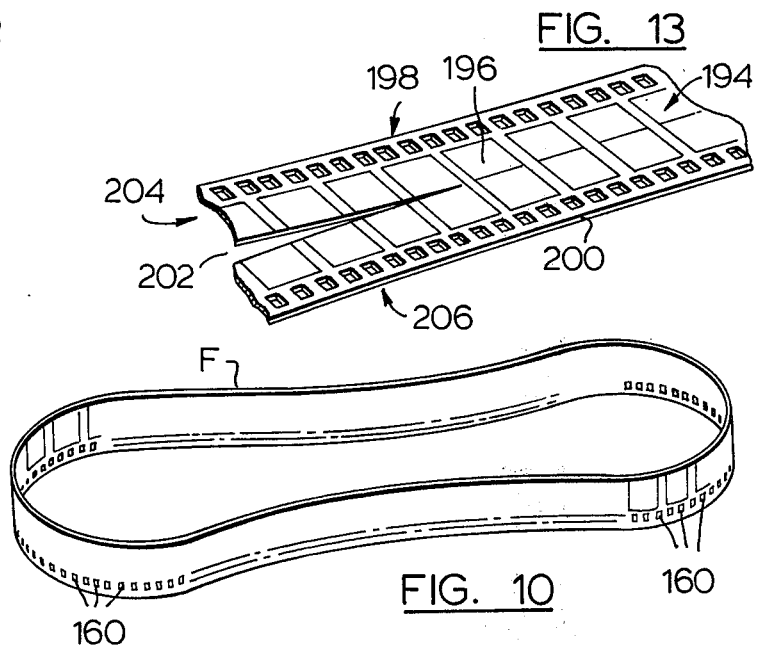
FIG. 13
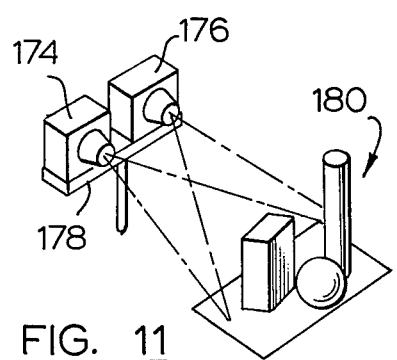
FIG. 11
FIG. 10
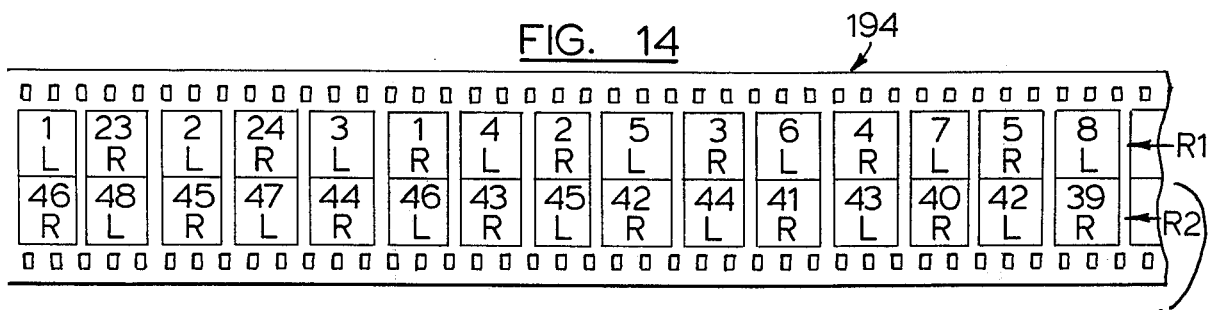
FIG. 14
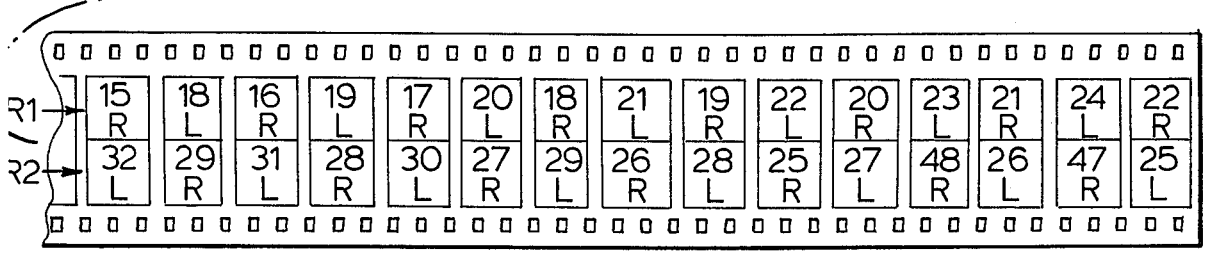

STEREOSCOPIC VIEWER

This invention relates generally to viewers for stereoscopic transparencies and the like.

A typical example of a conventional stereoscopic viewer is that sold under the trade mark "Viewmaster". Transparencies to be viewed are mounted in a disc-shaped holder which is inserted into a slot in the viewer. The holder is turned by hand to bring successive pairs of frames into positions for viewing. The transparencies are illuminated by naturally available light entering through the back of the viewer. Accordingly, the viewer must be directed towards a source of light for proper illumination of the transparencies.

A problem with this type of viewer is that it cannot conveniently be used in association with reading material. For example, where the transparencies carry educational material or promotional material related to a commercial product, it may be convenient to provide written notes or other information to be read in conjunction with the filmstrips. Since this type of viewer is normally used in an upwardly directed position in order to obtain adequate illumination, it is inconvenient for the user to continually have to look down at written material.

Also, the transparency holders are awkward and expensive to manufacture because the transparency frames must be individually mounted in the holder. Accuracy of mounting is of paramount importance in order to achieve proper registration of corresponding stereoscopic frames.

An object of the present invention is to provide an improved stereoscopic viewer.

According to one aspect of the invention there is provided a viewer which employs a stereoscopic filmstrip having a plurality of spaced perforations along one longitudinal margin and including a series of pairs of left and right hand stereoscopic frames. The viewer includes a casing for receiving the filmstrip and the casing includes a front wall, a rear wall, and a top wall. A pair of lenses are mounted in positions spaced transversely of the front wall for use in viewing the filmstrip. Film masking means are disposed inside the casing at a position spaced from and generally parallel to said front wall. The masking means defines a pair of apertures positioned to permit viewing of the respective left and right hand frames of successive frame pairs as the filmstrip is advanced through the viewer in use. Means are provided for guiding the filmstrip in a path which extends transversely of the casing rearwardly of the masking means. The viewer also includes a film transport mechanism disposed inside the casing and positioned laterally of said apertures in the masking means. The transport mechanism includes a film-engaging disc which is turnable about an axis normal to the direction of filmstrip movement and which has a peripheral series of teeth for engagement in said perforations in the filmstrip so that turning of the disc advances the filmstrip past said apertures. A drive member is provided for turning the disc and is itself turnable about an axis parallel to the turning axis of the disc. The drive member includes an operating lever which projects to the exterior of the casing for turning the member and which is movable from a rest position to a fully advanced position. The drive member is biassed to normally maintain the operating lever in said rest position. Ratchet means couple the drive member and disc so that movement of the operating lever from said rest position to said fully advanced position causes the disc to turn and advance the filmstrip unidirectionally by an amount equal to the spacing between successive pairs of films on said filmstrip. Detent means cooperate with said disc for preventing return movement of the disc in a direction counter to the film advance direction upon release of the operating lever. The viewer also includes means for illuminating the filmstrip. The illuminating means are defined by at least one light admitting aperture in the top wall of the casing, the aperture being positioned rearwardly of said masking means. Reflector means are arranged in an angular position at the rear of the film path for reflecting incoming light through the apertures in the masking means to illuminate the filmstrip.

According to another aspect of the invention there is provided a method of manufacturing a stereoscopic filmstrip. The method comprises the steps of:

a. simultaneously exposing to a series of subjects intended to appear on the filmstrip, successive portions of two conventional still-camera films, each two simultaneous exposures being taken from positions which are spaced laterally to an extent appropriate to produce respective left and right stereoscopic frames;

b. processing the films:

c. separating individual frames from the two films;

d. mounting the individual frames in a carrier with the frames arranged in first and second parallel rows in each of which the frames are equally spaced from one another, the respective left and right hand frames for each subject being spaced from one another longitudinally of the relevant row by four intervening frames and from the corresponding frames of adjacent subjects each by one intervening frame, the frames in said first row being arranged in a viewing sequence from a first end of the carrier to a second end thereof with the upper ends of the frames disposed adjacent the frames in the second row, and the frames in said second row being arranged in a viewing sequence from said second end of the carrier to said first end with the upper ends of the frames disposed adjacent the frames in said first row;

e. photographing said rows of frames using a conventional colour film having a row of perforations along each longitudinal margin;

f. processing said colour film to produce a film element carrying said two rows of frames in the form of positive transparencies; and g. separating said film element longitudinally between said two rows of frames to produce two filmstrips.

A still further aspect of the invention provides a filmstrip per se.

The invention will be better understood by reference to the accompanying drawings, in which:

FIG. 2 is an exploded perspective view of the viewer of FIG. 1;

FIG. 2a is an enlarged detail of part of FIG. 2;

FIG. 10 is a perspective view of the continuous filmstrip employed in the viewer shown in the previous figures; and, FIGS. 11 to 14 illustrate steps in the manufacture of the filmstrip of FIG. 10.

Figure 1:
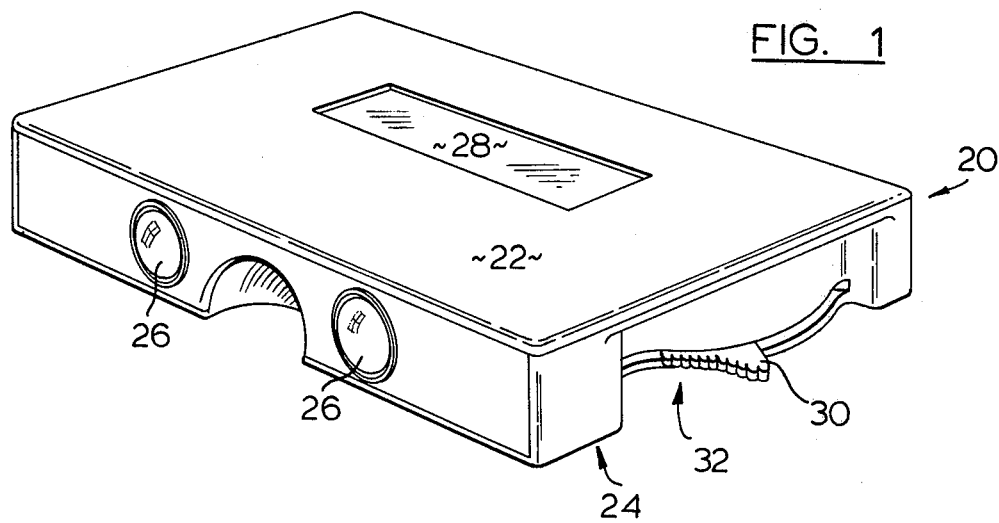
FIG. 1 is a perspective view of a stereoscopic viewer according to the invention.

Reference will first be made to FIG. 1 which illustrates the external appearance of the viewer. As can be seen, the viewer includes a generally box-form casing generally denoted 20. The height of the casing as seen in FIG. 1 is relatively small and is designed so that the viewer will fit relatively and easily into a pocket or purse of a user, or into a small package for mailing purposes. For the same reason, the casing is smoothly contoured.

Casing 20 includes an initially separate top 22 and a bottom section 24 to which the top is permanently sealed during manufacture. A continuous stereoscopic filmstrip (to be described) is housed in casing 20 and is viewed through a pair of lenses 26 in the front of the casing. The film is illuminated using naturally available light which enters the casing through a translucent panel 28 in top 22. The viewer includes a film transport mechanism (also to be described) operated by a lever 30 which projects through a slot in the side of casing 20. As can be seen, the casing is recessed at 32 in the region of the lever 30 so that the lever is disposed within the general external contour of the casing, maintaining the smooth external appearance thereof.

FIG. 2 shows the viewer of FIG. 1 in exploded form. As can be seen, the bottom section 24 of the casing 20 includes a rectangular base 34 having upstanding walls 36, 38 and 40 on three sides. Walls 36 and 38 are plain, while wall 40 is specially shaped to define the recess 32 for the operating lever of the film transport mechanism. Wall 40 also defines a slot 42 which extends parallel to base 34 and along which lever 30 moves. Wall 38 forms the rear wall of the casing and walls 36 and 40 the side walls.

Base 34 is formed with a generally semi-circular recess 44 which opens into the front edge of the base and which is surrounded by a bulbous formation 46 designed to accommodate the nose of a person using the viewer. A generally rectangular projection 48 extends upwardly from formation 46 and forms a support for an initially separate front panel 50 of the viewer. The ends of panel 50 are fitted in inwardly directed vertical slots 52, 54 formed in the respective side walls 36 and 40 of the bottom section 24 of the viewer casing. Panel 50 fits in front of projection 48 and has depending tabs 56, 58 in its lower edge which fit into complimentary recesses 60, 62 in the base 34. Two similar tabs 64 and 68 on the upper edge of panel 50 fit into other, similar recesses 70 and 72 in the top 22 of the casing. A generally semi-circular recess 74 in panel 50 cooperates with the bulbous formation 46 on the base 34.

Panel 50 is formed with two circular apertures 76, 78 which receive plastic lenses 80 and 82 respectively fitted to panel 50 from the rear side an secured in place by sonic welding.

Casing top 22 is shaped to fit snugly onto the upper edges of the wall 36, 38 and 40 of the bottom section 24 and is secured to those walls so as to hold in place the front panel 50 and the other components of the viewer (to be described). Angled ribs 84, 86, 88 and 90 on the underside of top 22 fit inside the walls 36, 38 and 40 and the front panel 50 to laterally locate the top 22. The bottom section 24 and the top 22 of the viewer (as well as substantially all of the other components of the viewer) are injection molded in plastic. Top 22 is accordingly secured to the bottom section 24 by sonic welding. Miniature ribs, one of which is denoted 92 in FIGS. 2 and 2a are provided on the underside of top 22 positions corresponding to the upper edges of the walls 36, 38 and 40 of the bottom section 24. These ribs are designed to fuse with the walls during the sonic welding operation and are designed so as other areas of the parts to be welded are not damaged during the actual welding operation. A similar technique is employed to prevent damage to the lenses 80, 82 when they are attached to the front panel 50 although, for ease of illustration, the miniature ribs have not been shown on lens 82.

A masking panel somewhat similar to panel 50 is located in the casing in a position parallel to and spaced from panel 50 and is formed with two film viewing apertures. This panel is shown at 94 in FIG. 2. The two apertures are denoted 96 and 98. These apertures are of standard 35 mm film size and are spaced to correspond with the spacing of the frames in each pair on the film contained in the viewer (to be described). The spacing corresponds to the spacing of the lenses 18 and 82 in panel 50 which in turn conforms generally with the spacing between an average person's eyes. Panel 94 is fitted into vertical slots 100 and 102 in the walls 36 and 40 respectively of the bottom casing section 24 and is located against a rib 104 molded into the base 34.

Figure 3:
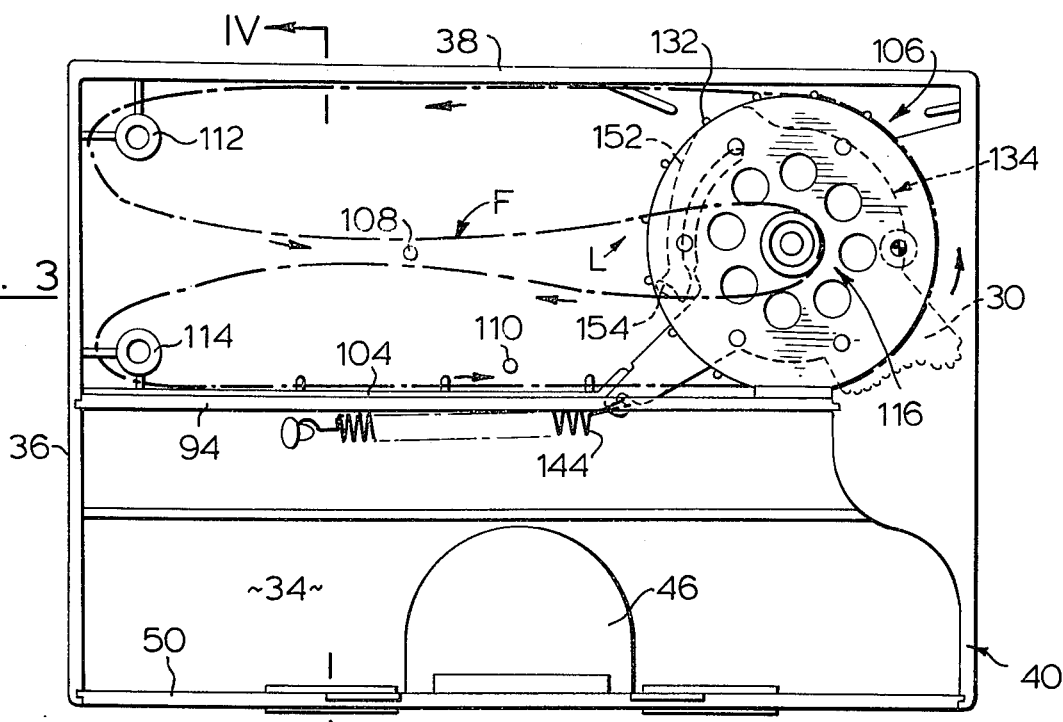
FIG. 3 is a horizontal sectional view on line III—III of FIG. 2.

It will be convenient at this stage to refer to FIG. 3 which is, in effect a plan view of the assembled viewer with the top 22 removed. In this view, the filmstrip is represented by a chain dotted line denoted F and the film transport mechanism is generally denoted 106. The film is in the form of a continuous loop and is arranged to follow a path defined by the transport mechanism 106 and a series of guide pins denoted 108 110, 112 and 114. As can be seen from FIG. 2, the pins 112 and 114 are in fact of tubular form while pins 108 and 110 are of solid cylindrical shape and are of somewhat smaller diameter. All of the pins are integrally molded with the base 34 of the casing. The direction of film advance is indicated by arrows in FIG. 3 and it will be seen that pin 112 guides the film leaving the transport mechanism 106 adjacent the rear wall 38 of the casing and then directs the film inwardly into a bight or loop L in which the film passes around the central spindle assembly 116 (to be described) of the film transport mechanism 106. Portions of the film F respectively approaching and receeding from assembly 116 are separated by pin 108. Film leaving loop L passes around pin 114 and travels transversly of the casing closely adjacent the rear surface of panel 94 before it is again engaged by the transport mechanism 106. Pin 110 maintains the film closely adjacent panel 94 during its travel from pin 114 to the transport mechanism.

Figure 4:
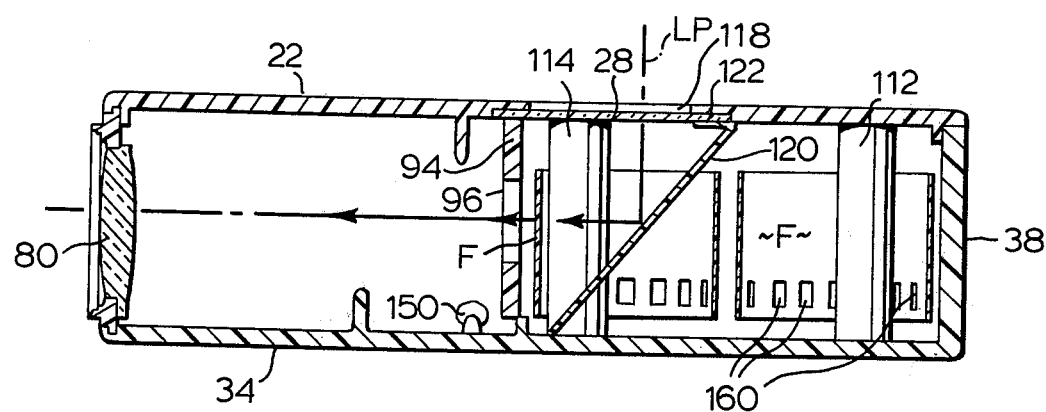
FIG. 4 is a transverse sectional view on line IV—IV of FIG. 3.

As indicated above, film being viewed is illuminated by naturally available light entering casing through the translucent panel 28 in its top 22. FIG. 4 illustrates the path of this light in travelling into and through the viewer. The light path is denoted LP in FIG. 4. As can be seen from that view, panel 28 is positioned behind an opening 118 in the top 22 of the viewer casing and is located just rearwardly of the viewing panel 94 and accordingly also just rearwardly of frames on the film F to be viewed. A reflector 120 is provided inside the casing to direct incoming light through the film F.

Since the light can be considered entering the casing generally normal to the top 22, reflector 120 is positioned generally at a 45° angle and extends from the innermost margin of panel 28 to a position just rearwardly of the film F.

Referring again to FIG. 2, the reflector 120 is formed by a piece of cardboard having a white finish on its reflective surface. The reflector is secured in position by a flap 122 which is folded inwardly with respect to the main portion of the reflector so as to lie in contact with the under surface of the translucent panel 28. Panel 28 is attached to the top 22 by a series of small cylindrical "pips" or studs 124 arranged in a recess 126 around the opening 119 in top 22. The studs 124 pass through corresponding holes 128 in panel 28 and melt during the sonic welding operation performed to attach the top 22 to the bottom section 24 of the casing, the fused studs serving to hold the panel 28 in position. Reflector 120 is located along one longitudinal margin of panel 28 and its flap 122 is formed with openings 130 corresponding to the openings 128 along the relevant margin of panel 28. Accordingly, flap 122 can be positioned over the relevant studs 124 so that the reflector is also secured in place during the sonic welding operation. The cutout 133 in the bottom longitudinal margin of the main portion of the reflector 120 fits around the film guide pin 110, thereby further assisting in the location of the reflector.

Referring back to FIG. 2, the film transport mechanism includes a film-engaging disc 132 and a drive member 134 which is positioned below disc 132 and is adapted to drive the disc to advance the film as will be described. Disc 132 and member 134 are rotatably mounted in superposed positions on a pin 136 which projects upwardly from the base 34 of the bottom casing section 24. Member 134 includes a main disc-shaped portion 138 having at its centre an aperture 140 which receives the pin 136. The operating lever 30 for the film transport mechanism (referred to above) is formed integrally at the periphery of the disc-shaped portion 138 of member 134 and projects through the slot 42 in the side wall 40 of the viewer casing as described above. It will be seen from FIG. 2 that lever 30 has a serrated outer surface 142 which is contoured to receive the thumb of a person using the viewer so as to facilitate operation of the transport mechanism. The direction of movement of lever 30 to advance the film is indicated by the arrow denoted A in FIG. 2. It will be appreciated that movement of lever 30 in the direction of arrow A will cause the drive member 134 to turn about pin 136 to an extent determined by the extent of movement of lever 30.

Figure 6:
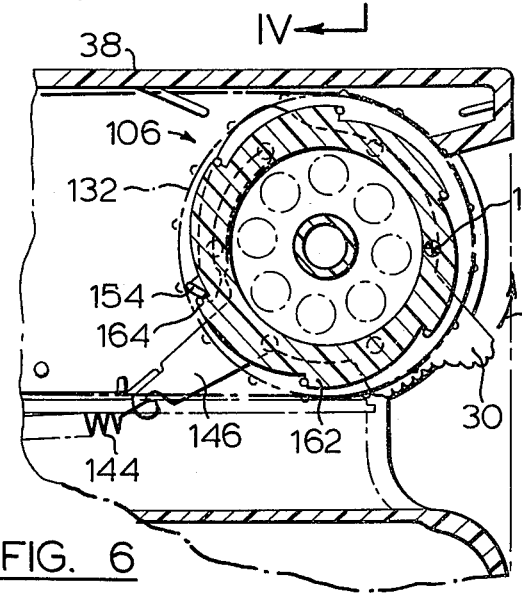
FIGS. 6 to 9 are sequential views corresponding to part of FIG. 3 and illustrate the operation of the film transport mechanism.

Drive member 134 is spring biassed to a position in which the operating lever 30 is disposed at the end of slot 42 nearest the front of the viewer as shown for example in FIGS. 3 and 6. Member 138 is biassed by a spring 144, one end of which engages the outer end of a radial arm 146 on the disc-shaped portion 138 of member 134. Arm 146 extends below the internal panel 94 of the viewer and is held by spring 144 against an angled end portion 148 of the rib 104 molded into the basin 34 of the bottom viewer casing section. Accordingly, this end portion 148 defines the rest position of arm 146 and hence the rest position of the drive member 134. The opposite end of spring 144 is engaged with a hook member 150 molded onto base 34.

Figure 7:
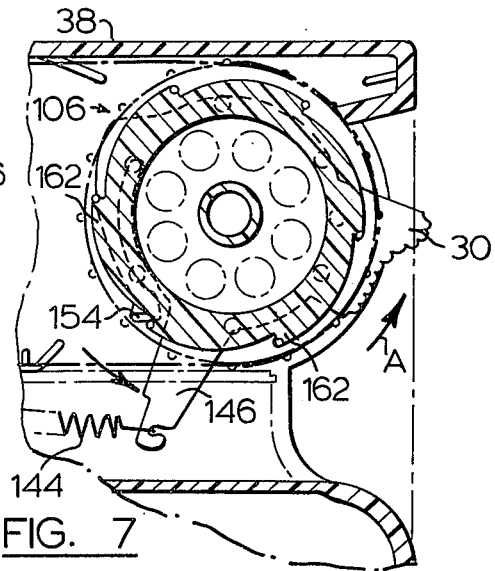
Figure 8:
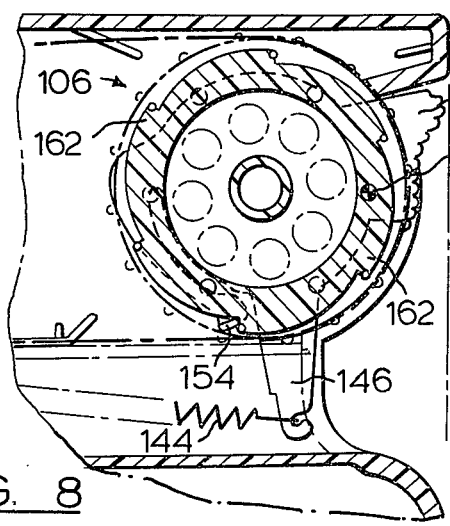

It will be appreciated from the foregoing that the drive member 134 is turnable about the pin 136 from the normal rest position in which it is shown in FIG. 6 progressively through the position of FIG. 7 to the FIG. 8 position in which spring 144 is fully extended. If lever 30 is released at this time, the drive member 134 will return to its rest position under the action of spring 144. Member 134 is coupled with the film-engaging disc 132 by what is in effect a pawl and ratchet arrangement designed so that disc 132 advances unidirectionally in increments each time lever 30 is moved from its rest position to its fully advanced position while return movement of the drive member under the action of spring 144 does not affect disc 132. The pawl and ratchet arrangement includes an integral spring-like arm 152 which projects from the disc-shaped portion 138 of drive member 134 at a position generally opposed to the position of lever 30 and which curves around the periphery of portion 138 to a position adjacent arm 146. A projection 154 at the outer end of arm 152 extends above the general plane containing the remainder of the member 134 for engagement with the underside of disc 132. Disc 132 is integrally connected to the lower end of a tubular member 156 which is turnably mounted on the pin 136 which also carries drive member 134. Around the periphery of disc 132 are a series of equally spaced sprocket teeth 158 for engagement in the sprocket holes 160 of the film F.

Figure 5:
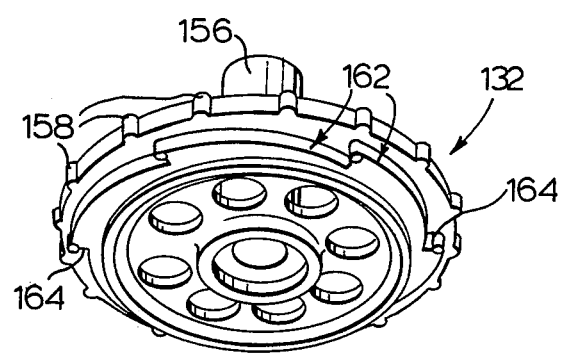
FIG. 5 is a perspective view of part of the film transport mechanism of the viewer.
Figure 9:
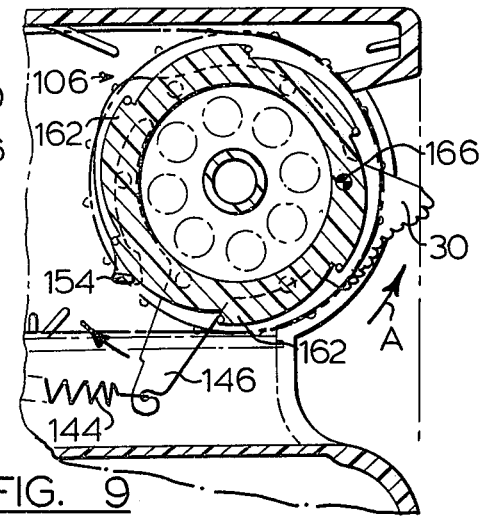

Referring now more particularly to FIG. 5, it will be seen that the under side of disc 132 is formed with a series of ratchet teeth 162 which are disposed inwardly of the sprocket teeth 158 of disc 132. Each tooth 162 has a profile which progressively curves upwardly from the root of the teeth. Each tooth defines a shoulder 164 for engagement by the projection 154 on the drive member 134 (see FIG. 2). FIGS. 6 to 9 illustrate the operation of this pawl and ratchet arrangement. In FIG. 6, the film transport mechanism is shown at rest with the projection 154 of the drive member engaged on one of the shoulders 164 of the ratchet teeth 162. Accordingly, movement of the operating lever 30 in the direction of arrow A in FIG. 6 (from its rest position towards its advanced position) causes projection 154 to rotate the disc 132 in the counter clockwise direction as shown in FIGS. 6 to 9. FIG. 7 shows the components at an intermediate position before lever 30 has reached the end of its travel. This fully advanced position of the operating lever 30 is shown in FIG. 8. The transport mechanism is designed so that the peripheral movement of disc 132 which occurs when lever 30 moves from its rest position to its fully advanced position is equal to the length of two frames of film F. The purpose of this will become apparent later. In any event, assuming that lever 30 is now in its fully advanced position (FIG. 8), if the lever is released, the drive member 134 is returned to the rest position by spring 144. Disc 132 is restrained against return movement with drive member 138 by a spring biassed ball 166 (see FIG. 2) which engages in one of a series of angularly spaced depressions 168 in the upper surface of disc 132. Ball 166 is urged downwardly against the upper surface of disc 132 by a coil spring 170 housed in a tubular member 172 which depends from the underside of the casing top 22. The arrangement is in fact such that, when the viewer is fully assembled, ball 66 just projects from the lower end of tubular member 172. The depressions 168 are spaced so that the angular movement of disc 132 which occurs between a position in which ball 166 is engaged in one depressions and a position in which the ball is engaged in the next depression, corresponds to movement of the operating lever 30 from the rest position to the fully advanced position. In FIGS. 6, 8 and 9 the position of ball 166 is indicated by a black circle denoted 166. In each of these views, the ball 166 is engaged in one of the depressions 168.

It will be appreciated that each time lever 30 is moved from the rest position to the fully advanced position, the film F will be advanced (in the direction of the arrows in FIG. 3) by an amount corresponding to the length of two frames of film F. Because of the arrangement of the frames on the film (to be described) this will result in successive pairs of stereoscopic frames being positioned behind the apertures 96, 98 in panel 94 of the viewer so that the frames can be observed through the lenses 80 and 82. The frames displayed will be illuminated by incoming light reflected through the film by reflector 120. The provision of translucent panel 28 in the top 22 of the viewer, together with reflector 120 allows naturally available overhead light to be used for illuminating the film. This avoids the need for the viewer to be angled towards a source of light as in conventional viewers. An advantage of this arrangement is that the user can readily use the viewer inconjunction with other material, e.g. written notes. The viewer can be used in an orientation in which it is angled generally downwardly towards the notes so that the user can readily shift his eyes from the lenses 80, 82 onto the notes adjacent the viewer.

FIG. 10 shows a loop of film F used in the viewer described in conjunction with the previous figures. The film is made from conventional 35 mm colour transparency film as will be described. A number of successive frames of the film are visible in FIG. 10 as are some of the sprocket holes 160, which are located along the bottom margin of the film considered in the position in which it is used in the viewer.

Reference will now be made to FIGS. 11 to 14 in more specifically describing the film and its method of manufacture.

By way of example, FIG. 11 shows two conventional 35 mm cameras 174, 176 mounted side by side on a support 178. A subject to be photographed is generally indicated at 180. The cameras are spaced by an amount corresponding generally to 1/30 of the distance between the cameras and the subject 180. This spacing formula has been found to result in realistic stereoscopic pictures even for large camera-to-subject distances. Both cameras are loaded with conventional 35 mm colour transparency film. Both films are simultaneously exposed to the subject 180, producing respective stereoscopic left and right hand frames showing the subject 180. Other subjects to appear on the filmstrip are similarly photographed using subsequent frames of the films in cameras 174 and 176. After exposure of all of the frames on both films, the films are processed and the individual frames are identified and separated from adjacent frames in the film.

The frames are then photographed in a predetermined arrangement (to be described). This is done by mounting the frames in groups of six on a series of carriers, one of which is shown in FIG. 12. In that view, the individual frames are denoted by the reference numeral 182. The carrier is in the form of a cardboard sheet 184, formed with six rectangular apertures 186, each of a size corresponding to the size of the portion of each frame to be viewed. The frames are attached to the lower side of the carrier using pressure-sensitive tape (not shown). If forty-eight pairs of frames are used, sixteen cardboard carriers will be prepared in this way. The carriers are then photographed (from above) in a predetermined sequence using a standard 35 mm colour film having a series of perforations on each longitudinal margin. The film is then processed to produce a film element carrying the frames in two rows in the form of positive transparencies and the film element is divided longitudinally to form two relatively narrow elongate filmstrips. In FIG. 13, a typical film element is indicated at 194. The frames which appear on the film element are denoted 196 and the sprocket holes along each longitudinal margin are denoted 198 and 200 respectively. The film element is divided by cutting as indicated at 202 and the resulting filmstrips are denoted 204 and 206. Each strip is formed into a continuous loop by splicing to produce a continuous loop filmstrip such as that shown in FIG. 10. The carriers may be photographed using a colour transparency film which is simply developed to produce the film element. This technique will normally be employed where relatively few copies of a particular series of frames is required. Where a large number of copies are required, the carriers may be photographed using a colour negative film from which copies can readily be made by contact printing. In this event, the developed negative film may be formed into an endless loop and copied in a motion picture contact printer.

Whichever method is used, the arrangement of the frames on the resulting film element 194 of FIG. 13 is as shown in FIG. 14. It will of course be appreciated that this layout corresponds to the layout of the frames or the carriers 184 and to the sequence in which the carriers are photographed. It will be seen that the frames are arranged in two parallel rows R1 and R2. Each row contains 24 pairs of stereoscopic frames, the frames in each pair including a left hand view and a right hand view of the subject in question. For identification purposes, corresponding frames are denoted by the same number and the letters L and R are used to denote respectively the left and right hand frames of a pair.

In the embodiment being described, different frames are used in rows R1 and R2. Accordingly, film 194 as a whole carries 48 pairs of different frames. The two filmstrips which result from longitudinal division of film 194 will therefore be different. It will of course be appreciated that, in an alternative embodiment, it will be possible to make both filmstrips 202 and 204 the same by using 24 pairs of frames in duplicate. In this event, the frames in rows R1 and R2 would be the same.

It will be noted from FIG. 14 that the respective left and right hand frames for each subject are spaced from one another longitudinally of the relevant row R1 and R2 by four intervening frames and are spaced from corresponding frames of adjacent subjects each by one intervening frame. For example, in row R1, the frames denoted $1_L$ and $1_R$ are spaced from one another by the frames $23_R$, $2_L$, $24_R$ and $3_L$ and the frames $1_L$ and $1_R$ are spaced from the frames $2_L$ and $2_R$ each by one frame ($23_R$ and $4_L$). It will also be noted that, in row R1, the frames $23_R$ and $24_R$ are positioned adjacent frames $1_L$ and $2_L$ respectively. This is done so that the frames appear in the correct sequence when film 194 is divided longitudinally and each half of the film is formed into a continuous loop.

It will be noted from FIG. 10 and from the preceding description of the viewer that the perforations in the filmstrip (denoted 160 in FIG. 10) are disposed at the lower margin of the filmstrip as used in the viewer. In other words, when the filmstrip is in the position shown in FIG. 10, the perforations 160 are at the bottom and the lower ends of the frames are adjacent the perforations. For this reason, the frames as positioned in the carrier (FIG. 12) are disposed with their lower ends adjacent the relevant row of perforations in the filmstrip. Considering the frames as shown in FIG. 14, therefore, the frames in row R1 would appear upside down although to avoid confusion, the numbers used to denote the frames have not been inverted in the drawing. It should also be noted that, for proper positioning of the frames with respect to the perforations, the frame sequence runs from left to right in row R1 and from right to left in row R2.

It will be appreciated that the arrangement of frames shown in FIG. 14 is advantageous in that it is not necessary to include blank or "jump" frames in order to achieve proper registration of the respective left and right hand frames in each pair with the viewing lenses 80 and 82 of the viewer. Also, the arrangement avoids the need for prisms, mirrors or other expedients in the light path between the viewer lenses and the filmstrip as is commonly found in the prior art.

It will of course be appreciated that the preceding description applies to specific embodiments of the invention only and that many modifications are possible within the broad scope of the claims. For example, referring to the viewer, although the description refers to the use of a filmstrip in the form of a continuous loop, it will be understood that the viewer could be adapted to accept a discontinuous length of filmstrip. Film exit and entry slots could be provided in the casing of the viewer to permit passage of the filmstrip therethrough.

A further possible modification of the viewer would be to allow the casing to be opened by the user for replacement of the filmstrip. For example, the rear portion of the casing top could be hingable to provide access to the filmstrip.

What I claim is:

1. A viewer for a stereoscopic filmstrip having a plurality of spaced perforations along one longitudinal margin and including a series of pairs of left and right hand stereoscopic frames, the viewer comprising:

a casing for receiving the filmstrip, the casing including a front wall, a rear wall, and a top wall;

a pair of lenses mounted in positions spaced transversely of said front wall for use in viewing said filmstrip;

film masking means disposed inside the casing at a position spaced from and generally parallel to said front wall, said masking means defining a pair of apertures positioned to permit viewing of the respective left and right hand frames of successive frame pairs as the filmstrip is advanced through the viewer in use;

means for guiding the filmstrip in a path which extends transversely of said casing rearwardly of the masking means;

a film transport mechanism disposed inside the casing and positioned laterally of said apertures in the masking means, said mechanism including: a film-engaging disc which is turnable about an axis normal to the direction of filmstrip movement and which has a peripheral series of teeth for engagement in said perforations in the filmstrip so that turning of the disc advances the filmstrip past said apertures; a drive member for turning said disc, said member itself being turnable about an axis parallel to the turning axis of the disc and including an operating lever which projects to the exterior of the casing for turning the member and which is movable from a rest position to a fully advanced position; means biasing said drive member to normally maintain the operating lever in said rest position; ratchet means coupling said drive member and said disc and adapted, upon movement of the operating lever from said rest position to said fully advanced position to cause the said disc to turn unidirectionally through an angle subtended at the periphery of the disc by an arc of a length equal to the spacing between successive pairs of frames on said filmstrip; and a spring biassed detent coupled to said casing in a fixed position with respect to said disc, the disc having an upper surface formed with a plurality of recesses for receiving said detent and arranged so that, when the detent is engaged in one of said recesses, the disc is prevented from return movement in a direction counter to the film advance direction upon release of said operating lever and one of said pairs of frames in the filmstrip is in registration with the openings in the film masking means, said recesses being equally spaced about the axis of turning of the disc by an angle equal to said angle through which the disc turns, so that the detent engages in a succeeding one of of said recesses only when said operating lever is moved from said rest position to said fully advanced position to turn the disc fully through said angle, whereby the detent maintains registration of said frame pairs with the openings in the film masking means; and, means for illuminating the filmstrip, said means comprising: at least one light admitting aperture in said top wall of the casing, said aperture being positioned rearwardly of said masking means; and reflector means arranged in an angular position at the rear of the film path for reflecting incoming light through said apertures in the masking means to illuminate the filmstrip.

2. A viewer as claimed in claim 1, wherein said film-engaging disc and drive member of the transport mechanism are arranged in superposed positions and are turnable about a common axis, and wherein said ratchet means comprises pawl means coupled with said drive member, and a peripheral series of teeth integrally formed on said disc and operably engaged by said pawl means.

3. A viewer as claimed in claim 1, wherein said means for illuminating the filmstrip further comprise a translucent light-transmitting panel closing said aperture in the top wall of the casing, and wherein said reflector means is defined by a cardboard panel having a light reflective upper surface and coupled to said top wall of the casing adjacent said translucent panel.

4. In combination, a viewer and a stereoscopic filmstrip;

the filmstrip comprising an endless film loop formed with a plurality of spaced perforations extending along one longitudinal margin only of the filmstrip, and including a continuous series of pairs of left and right hand stereoscopic frames arranged in a row in which the frames are equally spaced from one another longitudinally of the filmstrip, the respective left and right hand frames of each pair being spaced from one another longitudinally of the relevant row by four intervening frames and from the corresponding frames of the adjacent pairs each by one intervening frame, and wherein the right hand frame of the penultimate pair of frames in the series is disposed between and spaces the left hand frames of the first and second pairs in the series and the right hand frame of the last pair of frames in the series is disposed between and spaces the left hand frames of the second and third pair in the series;

and the viewer comprising:

a casing receiving the filmstrip loop, the casing including a front wall, a rear wall, and a top wall;

a pair of lenses mounted in positions spaced transversely of said front wall for use in viewing said filmstrip;

film masking means disposed inside the casing at a position spaced from and generally parallel to said front wall, said masking means defining a pair of apertures positioned to permit viewing of the respective left and right hand frames of successive frame pairs as the filmstrip is advanced through the viewer in use;

means guiding said filmstrip in a path which extends transversely of said casing rearwardly of the masking means;

a film transport mechanism disposed inside the casing and positioned laterally of said apertures in the masking means, said mechanism including: a film-engaging disc which is turnable about an axis normal to the direction of filmstrip movement and which has a peripheral series of teeth engaged in said perforations in the filmstrip so that turning of the disc advances the filmstrip past said apertures; a drive member for turning said disc, said member itself being turnable about an axis parallel to the turning axis of the disc and including an operating lever which projects to the exterior of the casing for turning the member and which is movable from a rest position to a fully advanced position; means biassing said drive member to normally maintain the operating lever in said rest position; ratchet means coupling said drive member and said disc and adapted, upon movement of the operating lever from said rest position to said fully advanced position, to cause said disc to turn unidirectionally through an angle subtended at the periphery of the disc by an arc of a length equal to the width of two of said filmstrip frames measured in the longitudinal direction of the filmstrip; and a spring biassed detent coupled to said casing in a fixed position with respect to said disc, the disc having an upper surface formed with a plurality of recesses for receiving said detent and arranged so that, when the detent is engaged in one of said recesses, the disc is prevented from return movement in a direction counter to the film advance direction upon release of said operating lever and one of said pairs of frames in the filmstrip is in registration with the openings in the film masking means, said recesses being equally spaced about the axis of turning of the disc by an angle equal to said angle through which the disc turns, so that the detent engages in a succeeding one of said recesses only when said operating lever is moved from said rest position to said fully advanced position to turn the disc fully through said angle, whereby the detent maintains registration of said frame pairs with the openings in the film masking means; and, means for illuminating the filmstrip, said means comprising: at least one light admitting aperture in said top wall of the casing, said aperture being positioned rearwardly of said masking means; and reflector means arranged in an angular position at the rear of the film path for reflecting incoming light through said apertures in the masking means to illuminate the filmstrip.

* * * * *